(12) United States Patent
Oltean et al.

(10) Patent No.: US 8,380,681 B2
(45) Date of Patent: Feb. 19, 2013

(54) EXTENSIBLE PIPELINE FOR DATA DEDUPLICATION

(75) Inventors: Paul Adrian Oltean, Redmond, WA (US); Ran Kalach, Bellevue, WA (US); Ahmed M. El-Shimi, Seattle, WA (US); James Robert Benton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 56 days.

(21) Appl. No.: 12/970,839

(22) Filed: Dec. 16, 2010

(65) Prior Publication Data

US 2012/0158672 A1    Jun. 21, 2012

(51) Int. Cl.
G06F 17/00 (2006.01)
(52) U.S. Cl. ........ 707/692; 707/770; 707/803; 707/809; 707/811; 707/706
(58) Field of Classification Search ........... 707/692, 707/770, 803, 809, 811
See application file for complete search history.

(56) References Cited

U.S. PATENT DOCUMENTS

| | | | |
|---|---|---|---|
| 7,401,080 B2 | 7/2008 | Benton | |
| 7,519,635 B1 | 4/2009 | Haustein | |
| 7,567,188 B1 | 7/2009 | Anglin et al. | |
| 7,814,074 B2 | 10/2010 | Anglin et al. | |
| 7,870,105 B2 * | 1/2011 | Arakawa et al. | 707/692 |
| 7,899,796 B1 * | 3/2011 | Borthwick et al. | 707/692 |
| 2009/0271454 A1 | 10/2009 | Anglin | |
| 2009/0313248 A1 | 12/2009 | Balachandran | |
| 2010/0082672 A1 * | 4/2010 | Kottomtharayil et al. | 707/770 |
| 2010/0088277 A1 | 4/2010 | Rao | |
| 2010/0088296 A1 | 4/2010 | Periyagaram | |
| 2010/0094817 A1 | 4/2010 | Ben-Shaul et al. | |
| 2010/0161608 A1 | 6/2010 | Jain et al. | |
| 2010/0174881 A1 | 7/2010 | Anglin | |
| 2010/0199065 A1 | 8/2010 | Kaneda | |
| 2010/0235332 A1 | 9/2010 | Haustein | |
| 2010/0241654 A1 | 9/2010 | Wu | |
| 2010/0250501 A1 | 9/2010 | Mandagere | |
| 2010/0332401 A1 * | 12/2010 | Prahlad et al. | 705/80 |
| 2011/0071989 A1 | 3/2011 | Wilson | |
| 2011/0125722 A1 | 5/2011 | Rao | |
| 2011/0138154 A1 | 6/2011 | Tevis | |
| 2011/0320865 A1 * | 12/2011 | Jain et al. | 714/6.22 |

OTHER PUBLICATIONS

Achieving Storage Efficiency with Data Deduplication, 2008, http://www.dell.com/downloads/global/products/pvaul/en/nx4-dedup.pdf.
Decentralized Deduplication in SAN Cluster File Systems, 2010, http://www.scs.stanford.edu/~jinyuan/dede.pdf.
How to Use Duplic8, Apr. 28, 2008.
Debar: A Scalable High-Performance De-duplication Storage System for Backup and Archiving, Tianming Yang, et. al., Apr. 23, 2010.

(Continued)

*Primary Examiner* — Sana Al Hashemi
(74) *Attorney, Agent, or Firm* — Gonzalez Saggio & Harlan LLP

(57) ABSTRACT

The subject disclosure is directed towards data deduplication (optimization) performed by phases/modules of a modular data deduplication pipeline. At each phase, the pipeline allows modules to be replaced, selected or extended, e.g., different algorithms can be used for chunking or compression based upon the type of data being processed. The pipeline facilitates secure data processing, batch processing, and parallel processing. The pipeline is tunable based upon feedback, e.g., by selecting modules to increase deduplication quality, performance and/or throughput. Also described is selecting, filtering, ranking, sorting and/or grouping the files to deduplicate, e.g., based upon properties and/or statistical properties of the files and/or a file dataset and/or internal or external feedback.

20 Claims, 8 Drawing Sheets

OTHER PUBLICATIONS

Permabit launches Albireo data deduplication for primary data reduction, Jun. 7, 2010.
Permabit Albireo™ High-Performance Data Optimization Software, Sep. 2010.
Extreme Binning: Scalable, Parallel Deduplication, Deepavali Bhagwat, et.al., Sep. 2009.
FBBM: A new Backup Method with Data De-duplication Capability, 2008.
Is data deduplication the best capacity optimization tool? Feb. 26, 2009.
Data Deduplication and its Benefits, Sep. 9, 2009.
Symantec Advocates Data Deduplication as Part of an Overall Backup Strategy, May 1, 2007.
HP StoreOnce: reinventing data deduplication, 2010.
Transform Your Backup Through Data De-Duplication, 2010.
"International Search Report", Mailed Jul. 20, 2012 Application No. PCT/US2011/065657 Filed Date Dec. 16, 2011, pp. 1-9.

* cited by examiner

EXTENSIBLE PIPELINE FOR DATA DEDUPLICATION

BACKGROUND

Data deduplication (sometimes referred to as data optimization) refers to detecting, uniquely identifying and eliminating redundant data in storage systems and thereby reducing the physical amount of bytes of data that need to be stored on disk or transmitted across a network, without compromising the fidelity or integrity of the original data. By reducing the resources needed to store and/or transmit data, data deduplication thus leads to savings in hardware and power costs (for storage) and data management costs (e.g., reducing backup costs). As the amount of digitally stored data grows, these cost savings become significant.

Data deduplication typically uses a combination of techniques for eliminating redundancy within and between persistently stored files. One such technique operates to identify identical regions of data in one or multiple files, and physically store only one unique region (chunk), while maintaining a reference to that chunk in association with the file for all the repeated occurrences of this data. Another technique is to mix data deduplication with compression, e.g., by storing compressed chunks.

There are many difficulties, tradeoffs and choices with data deduplication, including that in some environments, there is too much data to deduplicate all of it in one single operation given available time and resources, whereby consideration has to be given to which data to deduplicate, and how to stage progressive deduplication over time. Moreover, not all data that can be deduplicated yields equal savings (benefits) from deduplication, and there is thus the potential for doing a lot of work for little value. Other aspects of data deduplication, including file selection, data security concerns, different types of chunking, different types of compression and so forth also need to be dealt with in order to accomplish data deduplication in a way that provides desirable results.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which data deduplication is performed by a modular data deduplication pipeline, which is comprised by several phases/modules that operate in conjunction. At each phase, the pipeline allows modules to be replaced, selected or extended (have a new module added to the phase). The pipeline facilitates secure data processing, asynchronous processing, batch processing, and parallel processing. The pipeline is tunable based upon by internal and external feedback, e.g., by selecting modules to increase deduplication quality, performance and/or throughput, (where internal feedback refers to tuning based on data or file properties discovered by the pipeline, and external feedback refers to tuning based on external information passed to the pipeline, e.g. statistical information of previously deduplicated data on many machines.

In one implementation, the pipeline includes a scanning phase/module that identifies the list of files available for deduplication, and a selection phase/module that selects the files which fall within the scope and policy of deduplication. Also included is a chunking phase/module that performs the chunking, and a hashing module that generates a global hash that uniquely identifies each chunk. A compression phase/module that compresses the chunks (which may be before or after hashing) may also be included. A commit phase/module commits the reference data.

In one aspect, the scanning phase includes a groveler that selects files for deduplication via the pipeline. The groveler may access policy to determine which files to select for deduplication. For example, this phase/module examines the namespace of stored files and produces (using one or more various criteria) a stream of candidate files to be deduplicated. This may include maximizing the savings from deduplication, minimizing the impact of the deduplication on the performance of the system, and so forth. The groveler may operate on a snapshot of the files by processing the snapshot into a log of selected files for further deduplication processing. A selection phase coupled to or chained to the scanning phase may access policy to perform filtering, ranking, sorting and/or grouping of the files (e.g., based upon properties and/or statistical properties of the files) before providing the files for further deduplication processing via the pipeline.

The data deduplication pipeline includes a chunking phase that splits data of files into chunks via one or more modules/chunking algorithms. In one aspect, a chunking algorithm selector selects a chunking algorithm to use from among available chunking algorithms, such as based upon the file data and/or file metadata A deduplication detection phase determines for each chunk whether that chunk is already stored in a chunk store. A compression module may be used that tries to compress chunks that will be committed next. More particularly, chunk compression is an option, and may use a selected compression algorithm chosen from among available chunking algorithms based upon the chunk data, chunk metadata, file data and/or file metadata.

A commit phase commits chunks to the chunk store that are not detected as being already stored in the chunk store, and commits reference data for chunks that are already stored in the chunk store. Chunking, compressing and/or committing may be performed on different subsets of the files asynchronously and/or in parallel, e.g., on different machines (virtual and/or physical). In general, the pipeline model enables asynchronous processing of the data, generally resulting in performance and scalability advantages.

In one aspect, the files to be chunked may be queued for batch processing. The chunks that result may likewise be queued for batch processing by one or more subsequent modules of the pipeline. A similar batching technique may be also used for the chunks resulting in the chunking process In one aspect, the pipeline is coupled in a secure way to a hosting logical process configured to host a hosted module, such as the chunking module (or modules), or any other module or modules that access the file data or chunked file data. The hosting process includes a data access component that securely accesses the data for processing by the hosted module. For example, the secure process may obtain a duplicate file handle from the original process, and use the duplicate file handle to access the data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an extensible pipeline for data deduplication, in which various modules/phases of the pipeline facilitate data deduplication, including by providing module chaining, module selection, secure efficient module hosting asynchronous processing and/or parallel processing. In general, the various mechanisms needed for deduplication, e.g., file selection, chunking, deduplication detection, compression and committing of the chunks are each modularized in the pipeline, with the ability to replace, select among and/or extend each of the various modules.

In one aspect, the pipeline scans files with a two-phase log-based algorithm and selects files for optimization based on properties, with sorting, ranking and/or grouping based on statistical analysis and feedback. The selected files may be asynchronous, batched and/or processed in parallel for data deduplication. Further, the stages of the pipeline are adaptive with internal and external feedback hooks.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data deduplication processing in general.

Figure 1:
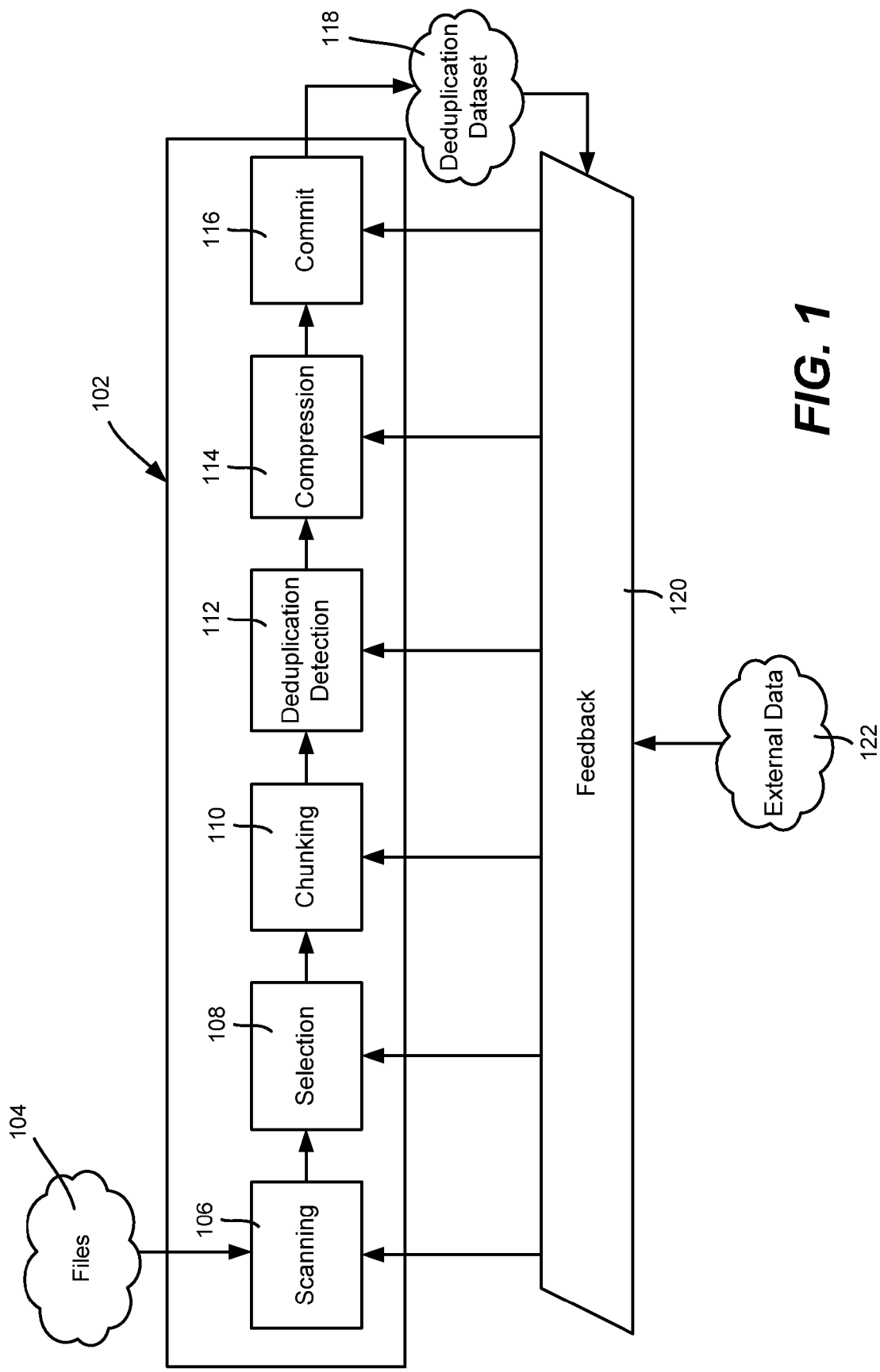
FIG. 1 is a block diagram representing example components/phases of an extensible pipeline used for data deduplication.
Figure 2:
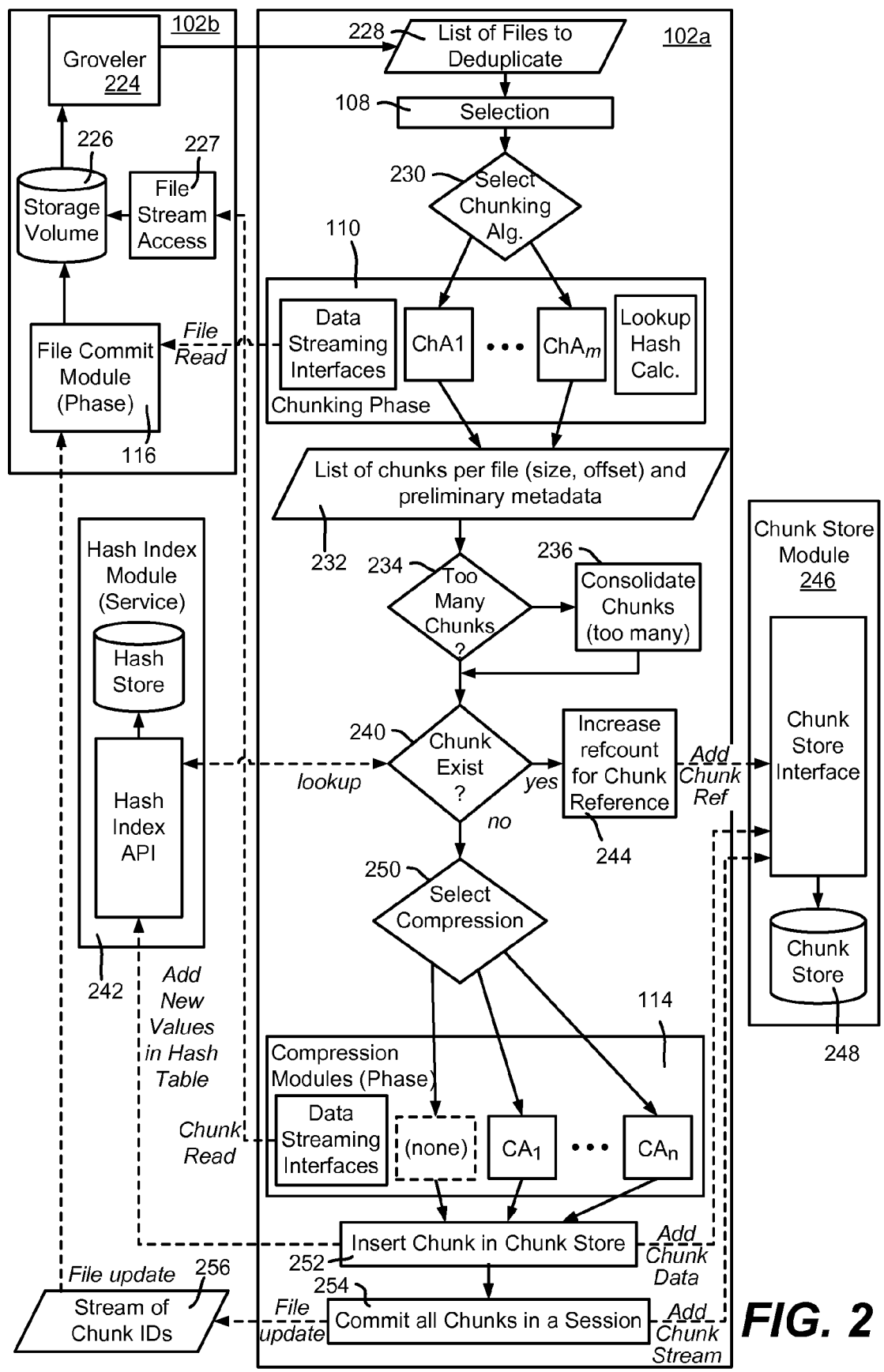
FIG. 2 is a block and data flow diagram representing additional details of the components/phases of an extensible pipeline used for data deduplication, along with example supporting components.

FIGS. 1 and 2 shows example concepts of a data deduplication pipeline 102, comprising a software component (or set of components) that handles the process of deduplication of files 104. Note that while files are used as an example herein, the deduplication target may comprise any collection of "data streams" in a unstructured, semi-structured or structured data storage environment, e.g., files, digital documents, streams, blobs, tables, databases, and so forth; the pipeline architecture is designed to be generic and reusable across a large variety of data stores. As described herein, the pipeline 102 comprises a number of phases, corresponding to extensible and/or selectable modules. Further, the modules (other than for deduplication detection) may operate in parallel, e.g., to facilitate load balancing. The pipeline architecture also provides isolation for crash resistance, security and resource management. These and other advantages are described below.

In general, deduplication splits each file (or other data blob) into a consecutive sequence of small data streams (called chunks), and then for each chunk, uniquely identifies each chunk using a hash and then performs a lookup (via a hash index) for the existence of a duplicate chunk that was previously inserted in the system. When a duplicate chunk is detected, the specific region in the file corresponding to the original chunk is updated is updated with a reference to the existing chunk and the chunk from the file discarded. If a duplicate is not detected, the chunk is saved to a chunk store in one implementation (or other suitable location), indexed, and the file updated with a reference to the new chunk, which may then be detected for referencing by other files. The pipeline also may perform compression of the chunks.

To track the chunks, each file contains references to its chunks at are stored into the system, along with their position in the current file, instead of the file data, which consumes far less storage when multiple files reference the same chunk or chunks. In one implementation, the file is replaced with a sparse file (if not already a sparse file) having a reparse point and/or stream that references the corresponding chunk data. The reparse point and/or stream contain enough information to allow the reconstruction of its corresponding file data during subsequent I/O servicing. Alternative implementations to link files and corresponding chunks are feasible.

The pipeline 102 (labeled in FIG. 2 as 102a and 102b; note that the file-system related modules 102b may be considered independent of the pipeline) includes file-system related phases, implemented as one or more modules per phase. This includes a scanning phase 106 (including a scanner/groveler module 224) that scans the set of files 104 of a storage volume 226 or the like to determine which ones are candidates for deduplication, generally those not already deduplicated. Other policy and/or criteria may be used, such as to not "specially treat" encrypted files, for example, because such files may seldom if ever have a chunk that will match another file's chunk. The scanning phase's output basically comprises a list of files 228 that is dynamically consumed by the next phase of the deduplication pipeline, comprising a selection phase 108.

The file system groveler 224 thus identifies the files to be optimized in this optimization session, generally those not yet deduplicated, to output the list 228 that is dynamically consumed by the rest of the pipeline. The groveler 224 may work in an incremental manner by quickly excluding already-optimized files such that its scalability is not significantly impacted by already-optimized files. The groveler 224 is able to provide a consistent list of files, such as by reading from a snapshot of the scanned volume as described below. Block 102b also includes file streaming interfaces for file stream access, which provide secure access to the file content, e.g., for use in chunking and compression modules as described below, (note that chunking/hashing/compression modules may not have direct access to the file system (and may not be tied with file system features at all), whereby such modules may have access via a set of streaming interfaces that provide a virtualized access to the file stream.

Note that during a deduplication session, a snapshot of the files may be taken, the list of files 228 can be temporarily stored into a persistent queue in order to ensure consistency in building the list of files to be scanned, and the snapshot discarded when no longer needed. The log allows for pausing and resuming of the deduplication process and crash resistance, while minimizing the scan impact and providing other benefits, e.g., allowing for progress/status reporting, estimating the overall data size (useful in computing data structure such as index sizes) and so forth. Additional details of this two-phase process are described below with reference to FIG. 6.

In general, the selection phase 108 filters, sorts and/or prioritizes (ranks) the candidates, so that, for example, the ones most likely to yield high deduplication gains are processed first through the pipeline. Files also may be grouped to facilitate efficient processing and/or to enable optimal selection of the most appropriate modules to be used in further stages of the pipeline. File properties such as file name, type, attributes, location on the disk, and so forth, and/or statistical property data such as frequency of file operations over time may be used to determine the policy for the selection phase 108. In general, the scanning phase 106 (groveler 224) and selection phase 108 (file selector/filtering and so forth) generally work together according to policy-driven criteria before feeding files to the rest of the pipeline. Unlike static filters that consider each file in isolation for selection, the filtering may consider files in the entire data-set and are thus data-set driven. For example, files which changed within the same time period and/or files with similar path/name attributes may be filtered, similarly ranked and/or grouped together. External data may also be used in filtering, such as local feedback from previous deduplication or global knowledge learned from other deduplication operations and implementations.

A ranking score may be assigned to each file (rather than a simple include/exclude filtering decision). Such scoring facilitates ranking to prioritize which files (or sub-files) are handled first in order to extract most of the deduplication savings as soon as possible. Scoring may be based upon machine learning techniques, such as using features weighted by processing deduplication results. Grouping based upon file properties, which may include the assigned ranking score, is another option, which helps in batching, parallelization, splitting, chunking, memory usage (e.g., keeping relevant data/modules for the same group in RAM) and so forth.

Also represented in FIG. 2 is file stream access (module) 227, by which file access may be done with low priority I/O to minimize the performance impact of file reads on the underlying system. The file stream access module 227 may use techniques such as oplocks to ensure that the pipeline "backs-off" from the file and closes its handles as soon as some other external application tries to access the file. In this way, the rest of the pipeline modules that access the file content (chunking, hashing and compression modules) are simpler to implement as they do not have to implement back-off logic by themselves. Via the module, file stream access is accomplished in a secure way using duplicated file handles that are securely transmitted from the pipeline processes to the hosting processes that contain these modules as described below.

A chunking phase 110 (which may include or follow file decompression as needed in a given implementation) decomposes the file content into chunks; the chunks may be compressed. Chunking may be performed as according to the structure of the file, content-driven algorithms (e.g., partition a media file into a media header and media body which in turn can be hierarchically split in a sequence of parts), or by using an algorithm to chunk the file contents based on fast hashing techniques (such fast hash functions include CRC and Rabin families of functions) that is repeatedly computed on a sliding window, where a chunk is being selected when the hash functions and the current chunk size/content meets certain heuristics.

For every file chosen to be deduplicated, the chunking phase 110 of the pipeline 102 may select (block 230 of FIG. 2) a chunking algorithm $ChA_1$-$ChA_m$ depending on heuristics that may involve file attributes such as file extension, header information, and so forth. For example, a generic chunking algorithm may be selected for one file, whereas another file may have a chunking algorithm ones specific to its file extension (such as a chunking algorithm for ZIP parts). A chunking algorithm also may be selected based on hints from the file selection phase 108 or based on internal or external feedback 120.

After a certain chunking algorithm is selected for a current file, the pipeline's chunking phase 110 performs the chunking. The chunking phase prepares a file record containing file-related metadata (such as file name, size, and so forth) that may be used by the chunking algorithm. The actual chunking algorithm may be executed in process (if its execution is safe) or in a separate hosting process (if there is a security risk). A separate host also helps with resource monitoring and reliability and resiliency of the pipeline; for example, if a chunking module hits a "fatal" failure, the pipeline is not affected and is be able to restart the failing module. The pipeline is able to skip the file and process the next files with the restarted module.

As described below with reference to FIGS. 3-5, for a separate host, the pipeline (a data streaming initialization module coupled thereto) may initialize a "data streaming object" representing a handle to the data stream of the file. This handle is used for file content access in the hosted process, which is secure. The chunking phase 110 inserts the file record into the appropriate input queue for the hosting module associated with the selected chunking algorithm. When this queue buffer reaches a certain size, the entire buffer is sent to the hosted module for batch processing. The hosted module executes the chunking for every file in the batch, using the file handle initialized above.

The result of the chunking phase comprises a list of chunks (per file) 232, which are passed using a set of "chunk records," each of which contains associated metadata describing the type of data in a chunk. One example of such metadata is any rolling hash computed as part of the execution of the chunking algorithms. Another example is an indicator of the compression level of the actual data within the chunk (for example, the ZIP chunking module will instruct the compression selector module not to compress chunks that are likely already compressed). Note that for hosted process execution, the chunks are inserted into an appropriate "output queue" for processing and then sent in batches to the pipeline process.

The chunks, which may be processed in batches, are consumed by the next stage of the pipeline, namely a deduplication detection phase that uniquely identifies each chunk through hashing and then uses the hash for deduplication detection, to provides a list of chunks whose chunks are already inserted in the chunk store. Note that as represented in FIG. 2 via blocks 234 and 236, deduplication may be avoided/the chunks consolidated if there are too many. More particularly, before adding the chunks to the output list, an extra "chunk merge" may be performed if there are too many chunks. This step may be based upon certain policy configurations that restrict no more than X chunks per MB as a way to not degrade the I/O performance, e.g., due to extra seeks beyond a certain limit, or by ensuring a certain maximum number of chunks per file, or max chunks per MB of data. An alternative approach is to perform a lookup before issuing a merge, which may offer more granular savings (but incur a penalty on the deduplication time).

After chunking, the deduplication detection phase 112 determines whether the chunks already exist in the chunk store. A strong hash calculated for the chunk is computed to invoke a lookup operation (block 240) in a hash index service 242. The hash index service indexes the hashes of some or all of the unique chunks that are already known to the deduplication system (or already stored within the deduplication system).

Note that the hash index service may comprise a separate (extensible) module in the pipeline for hash calculation. For example, one such module may use a cryptographically strong hash such as SHA-256 or SHA-512 which ensures an extremely low probability of collisions between hashes. The input of such a module comprises chunk "records" that contain a reference to the chunk, such as file identification/metadata, file handle) and chunk offset within the file. The hashing module may reads the chunk securely using the above-described file stream access interfaces and hashes the content, producing the strong hash required for subsequent phases. The output of this module (the string chunk hash) is appended to the existing chunk metadata.

If the hash index service 242 indicates that the chunk is already present in the chunk store, a chunk reference/count (block 244) is added to the chunk store module 246/chunk store 248. If the chunk is not yet present, the chunk is added as a new chunk to the chunk store 242. Note that the hash index service may be configured with efficiency-related considerations, which do not necessarily guarantee that a chunk is not already stored, and it is possible that a chunk will be duplicated more than once in a deduplication system. Thus, as used herein, when the hash service determines that a chunk does not already exist in a chunk store (or stores), this means only to a reasonable likelihood, not necessarily a perfect guarantee that it does not already exist.

The chunk store module 246 maintains a persistent database of the actual chunks. The chunk store module 246 supports Inserting a new chunk into the chunk store 248 (if there is no such chunk yet), adding reference data (block 244) to an existing chunk in the chunk store (upon detecting a previously persisted chunk), and committing a set of chunk inserts and/or chunk reference additions as described below. The chunk store also may implement various background/maintenance jobs, including garbage collection, data/metadata checking, and so forth.

The chunk store module 246, like every other module, is pluggable and selectable, as well as extensible. The pipeline 102 may work with multiple chunk stores and store chunks based on their attributes. For example, popular chunks may be stored in a near-line low-latency low-scale store, while the rest of the chunks may be stored in higher-latency, high-scale chunk store.

Chunks marked as "add to the chunk store" may be processed with respect to compression. A compression algorithm selector (block 250) processes the file and chunk metadata (provided thus far by the pipeline) and may try to determine which compression algorithm $CA_1$-$CA_n$ (if any) works best for this type of data. After any compression is performed, the runtime (e.g., as part of the compression phase 114) may verify whether any substantial savings were made; for example if a compressed chunk is larger than its uncompressed form, is stored uncompressed (or compression may again be attempted with a different algorithm). The compression algorithm may be selected based on policy, file type, and so forth.

To add a new chunk to the chunk store 248, for a given file, this operation is done in two phases by a commit module (phase) 116, corresponding to modules 252 and 254 of FIG. 2. First, the new chunks are added (e.g., in a batch) to the chunk store 242. Second, after the file chunks have been processed, the list of chunks is "committed" to the chunk store 242. The list of chunk locators is serialized into a "stream map" self-referencing structure (that can be represented as a byte array), which is then used to create a chunk stream. The locator of this new chunk stream is stored in the reparse point associated with the file.

A file commit module/phase 116 transactionally replaces each file with references pointing to the deduplicated data. To this end, the file commit module receives a list of files whose chunks are already inserted in the chunk store. In one implementation, each chunk list is encapsulated in a chunk ID stream 256 (identified by a unique Stream ID), which is persisted into a reparse point associated with the file. During the commit operation, the file commit module transactionally (that is, crashes that occur during these updates do not leave the file system or the logical file content in an inconsistent state) replaces the file with a reparse point containing the ID and locator of the chunk stream ID, that is, the chunk containing the stream map, comprising the list of chunks used to assemble the current file and their logical offsets.

Note that file system updates may be committed in a batch. For example, replacing the reparse point for a number of N files (N being in the order of hundreds, thousands) may be followed by a flush operation that ensures file system-level consistency of the file system with respect to the previous state before optimization. Files that change during the deduplication are able to ignored, because the groveling/scanning is done on a snapshot, and timestamps can be evaluated for mismatches as described below.

As seen above, the data deduplication session is fully reentrant and restartable (regardless of whether a crash, reboot, failover occurs in the middle of processing). As can be readily appreciated, the pipeline is also capable of operating with low system resources, e.g., low priority I/O and low CPU resources, and the pipeline is designed to operate reliably and maintain data consistency irrespective of the reliability of the hardware beneath it. Further, the data deduplication system is designed to work in a high performant asynchronous/batched mode in all its phases. Multiple instances of the modules may be created and may operate in parallel (either on one machine or multiple machines) leading to better overall utilization of hardware resources. For example, activities that are CPU-intensive (chunking, hashing and compression) may be load-balanced across multiple CPUs by a generic job execution infrastructure that is implemented as part of the pipeline. Additionally, the design supports asynchronous, independent execution of multiple data deduplication pipelines in parallel for multiple volumes.

Moreover, the phases of the pipeline are also externally tunable and provide hooks for feedback 120 (FIG. 1), that is, the pipeline is adoptable and can adjust its policies, selection algorithms, parameters and the like while it runs or for future runs based upon already-gained knowledge. The feedback may be internal (based on already-processed data) and/or external 122 (provided by an external entity, for example based on data optimized on other volumes or other machines).

Figure 3:
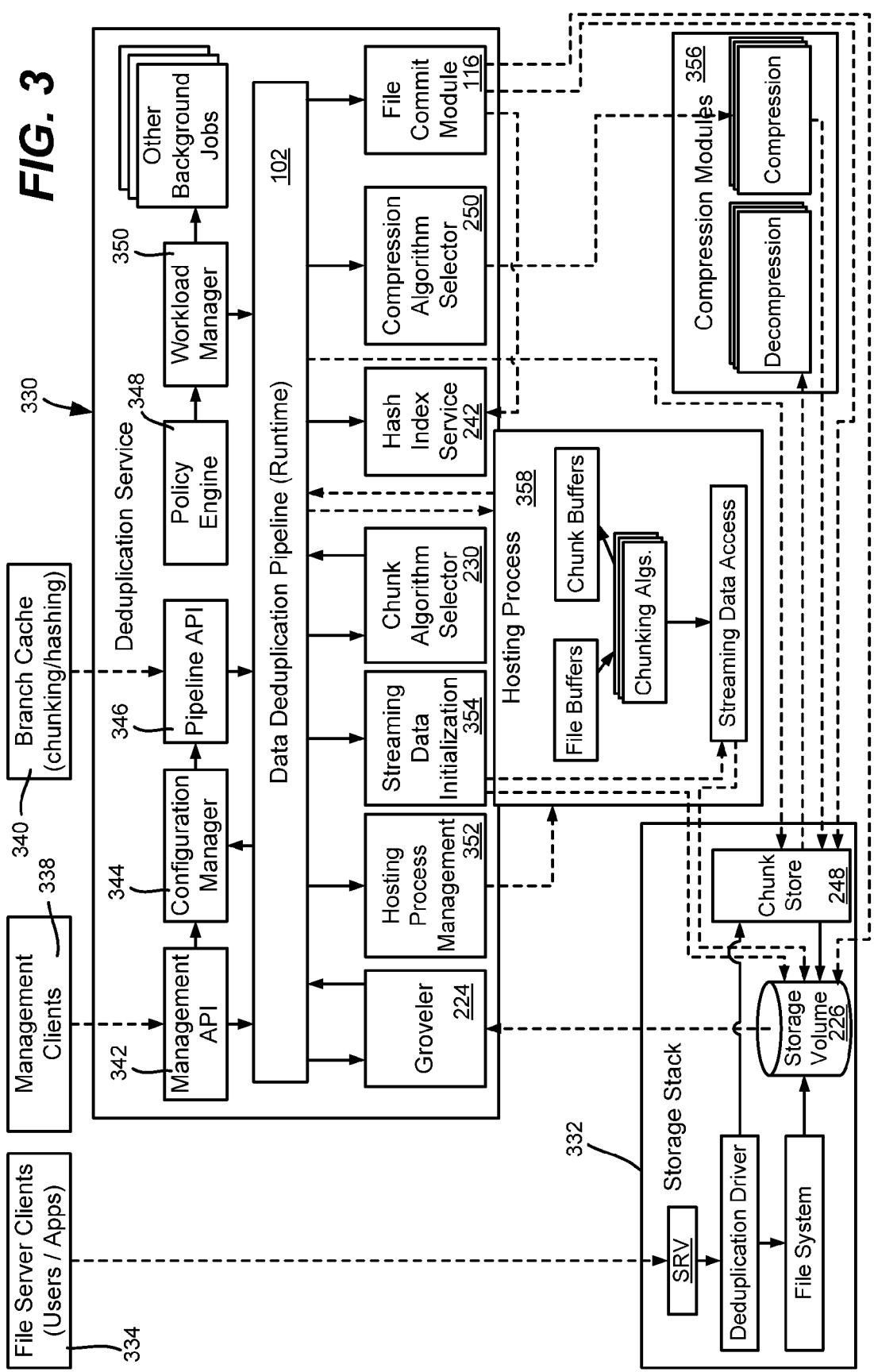
FIG. 3 is a block diagram representing how an extensible pipeline may be incorporated into a data deduplication service with other components in a data deduplication environment.
Figure 4:
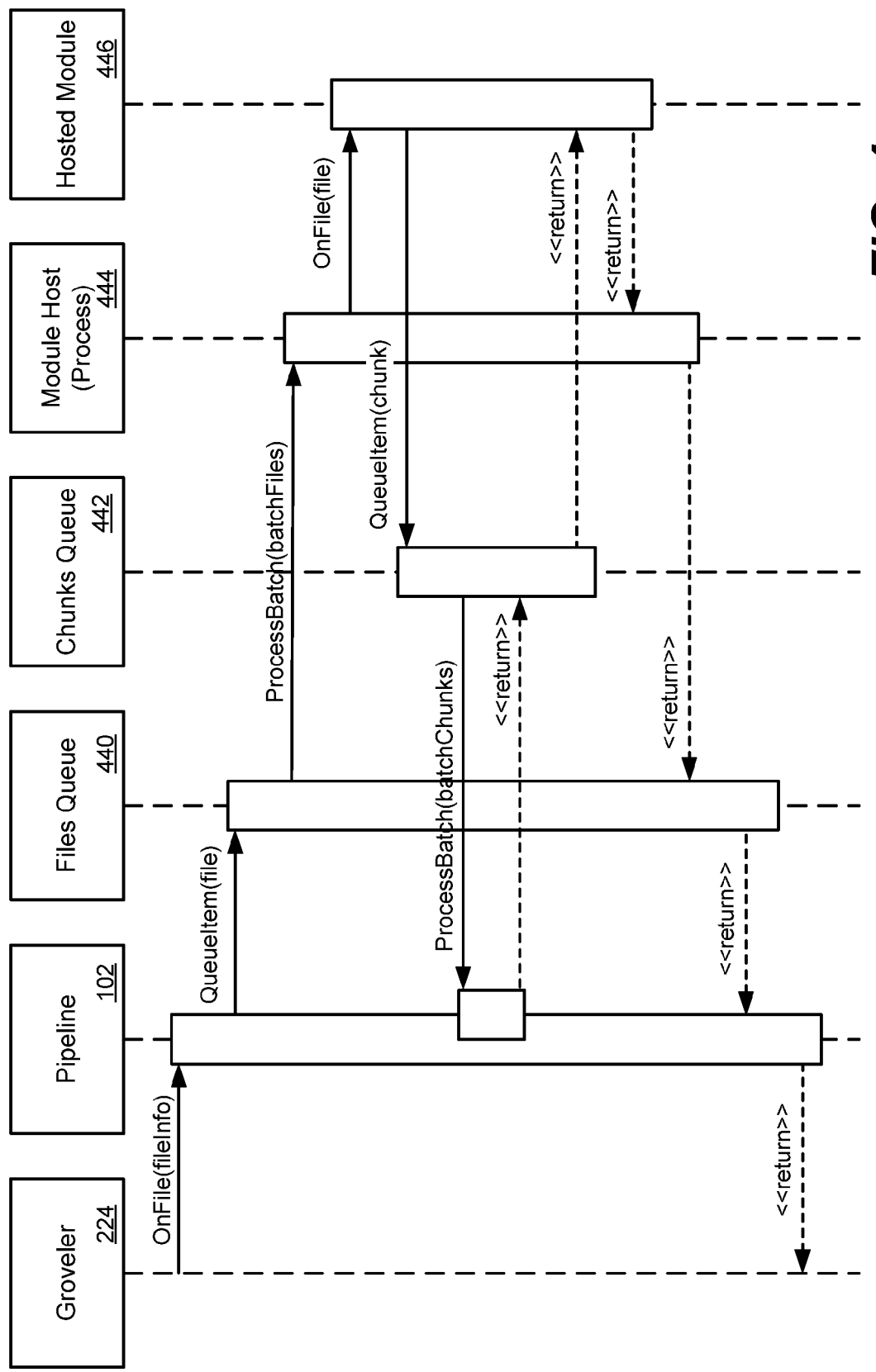
FIG. 4 is a representation of data flow/calls between various components including queuing to support batch processing of files and data during data deduplication operations.
Figure 5:
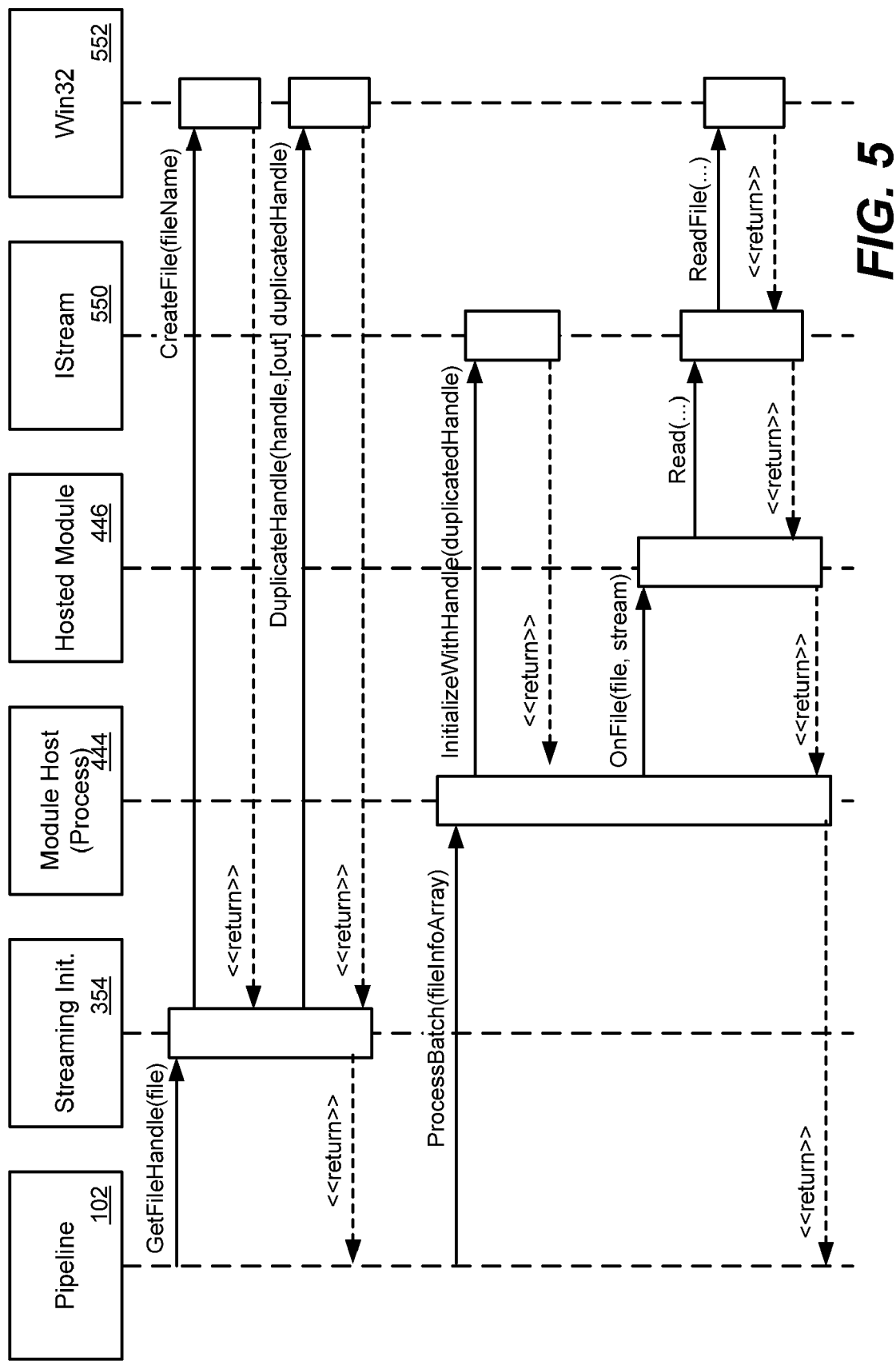
FIG. 5 is a representation of data flow/calls between various components including data flow/calls to obtain a duplicate file handle to provide for secure data handling during data deduplication operations.

FIGS. 3-5 provide additional details of the pipeline components and their main interactions in the examples of a data optimization session on a single volume, and serving data for an optimized file. The pipeline operates in a deduplication service 330 coupled to a storage stack 332, which may be accessed by file server clients 334, such as typical file server clients that access files through SMB, NFS or other protocols. The storage stack includes SRV, comprising the drivers for implementing the SMB stack (e.g., SRV2.SYS, a deduplication driver for handling the I/O path for the optimized files, and the chunk store 242 as described above. In the examples herein, NTFS is the underlying file system holding deduplicated and non-deduplicated files for the storage volume.

The deduplication service 330 may be accessed by management clients 338 comprising scripting, command line, UI or other management applications that remotely or locally administer the deduplication service 330 on a current machine, e.g., though a public API. Also represented are server-side branch cache service components 340 that use the data deduplication service 330 to generate chunks/signatures for the files being served in branch cache scenarios.

As represented in FIG. 3, the deduplication service 330 includes a management/configuration API module 342, which exposes management APIs for the deduplication service 330. This API also exposes functionality for managing aspects of the data deduplication, such as defining the directory inclusion/exclusion rules for the file deduplication, workload management, and so forth. The configuration manager 344 comprises a module that maintains persistent configuration state such as publicly-exposed or private "tuning knobs," scheduling information, policy settings, and the like. A pipeline API exposes an API set 346 that is callable by other external components that consume the functionality of the pipeline 102, such as the branch cache service components 340.

The policy engine 348 comprises a module for managing the policy settings for the volume or the entire machine. Such policy settings may include policy such as the minimum age of the files considered for deduplication. The workload manager 350 comprises a module responsible for initiating and coordinating multiple background management jobs/maintaining the service in operational state (some of these jobs may be mutually exclusive). Running the data deduplication pipeline is one of these jobs, which is typically a scheduled background job, but may be run on demand. At the end of the execution, the workload manager 350 may generate a report. The workload manager 350 defines the process model for the optimization workloads, and in one implementation assumes that the pipeline optimization may run in its own separate worker processes (one process per scan) which allows natural machine resource sharing during parallelization of scans. Other jobs may include garbage collection, defragmenting the chunk store, data integrity checking, metadata checking, and so forth.

The hosting process management component 352 is generally responsible for managing (e.g., creating, tearing down) low-privilege hosting processes for the data-manipulation and data-parsing algorithms, such as chunking modules. These modules are run in a separate low-privilege process for security reasons. The streaming data initialization module 354 comprises a utility module used to prepare secure access to the actual file streams within the low-privilege hosted processes.

Also represented in FIG. 3 is a compression/decompression module 356, which in one implementation comprises a shared library for handling in-memory compression and decompression of chunks/buffers. The compression phase 114 may be performed done during data deduplication (as described above), while decompression is used during the read/write path (dehydration) phase.

The hosting process 358 comprises a process designed to host modules in an low-privileged, isolated manner, such as hosted chunking modules running in a separate process. Examples include file and chunk buffer management modules that are responsible for managing input/output buffers for the hosted chunking module, which are used to minimize cross-process traffic. Other examples include hosted chunking algorithms comprising the in-process modules that perform the actual data chunking as described above, and a streaming data access module, comprising a library implementing an API for secure data access from within the hosted process. Note that the hosted algorithms do not have direct access to the file system for security reasons.

A data deduplication session is generally invoked on a scheduled basis. The same deduplication sequence (called a "deduplication session") may be performed on for every volume involved during the deduplication. The example below is described for a single volume, however it is understood that one volume or multi-volume and/or or multi-machine deduplication may be done in parallel.

Before the actual deduplication, an initialization stage of the pipeline may be performed, including reading the latest policy and configuration settings from the configuration manager 344, and reading the per-volume persistent state, such as the latest value of the locality indicator (for the hash index). Other initialization actions include instantiating the pipeline modules, including hosted chunking algorithms. During this stage, the hosted processes are started and initial input/output queues are initialized. Also during this stage, each module in the pipeline is configured with appropriate parameters, e.g., read from a configuration database. Still further, the hash index service 242 is initialized to load its in-memory data structures to be ready to serve chunk hash lookup requests, and the groveler module is initialized to initiate the file scan on the current volume. For consistency reasons, the groveler may have its own per-module initialization phase, which may include an operation such as creating a snapshot of the volume. As part of preparation, the data streaming initialization module 354 initializes a "data streaming object" representing a handle to the data stream of the file. This handle is used for file content access in the hosted process as described below.

During the optimization session, the groveler 224 scans the files, filters them according to the policy-driven criteria and feeds them to the pipeline 102. The files supplied from the groveler might not be in the actual scan order, as the selection mechanism 108 (FIG. 1) may sort the list of files according to different criteria, such as last modify timestamp, file type, and so forth.

For every file chosen to be optimized, the pipeline selects a chunking algorithm, e.g., depending on file attributes such as file extension, header information, and so forth, and the pipeline 102 runtime (chunking phase 110) performs the chunking. The runtime prepares a file record, containing file-related metadata (such as file name, size, and so forth) that may be used by the chunking algorithm. The actual chunking algorithm might be executed in process (if its execution is safe) or in a separate process (if there is a security risk). If the chunking algorithm is hosted directly into the same process, it is simply executed.

If the chunking algorithm is implemented in a separate hosting process, asynchronous/batched mode execution is generally performed. To this end, as generally represented in FIG. 4, the pipeline runtime inserts the file record into an appropriate input queue 440 for the hosting module 444 (e.g., corresponding to the module 358) associated with the selected/hosted chunking algorithm, e.g., the hosted module 446. If this queue buffer reaches a certain size, the entire buffer is sent to the hosted module 446 for batch processing.

The hosted module 446 executes the chunking for every file in the batch, using the file handle initialized above. The result of the chunking execution is a list of chunks (per file), which for hosted process execution are placed into a chunks queue 442 for batch processing. These resulting chunks are passed back using a set of "chunk records" that contain associated metadata describing the type of data in these chunks. Examples of such metadata are described above.

In this way, the pipeline 102 supports a high-performance asynchronous/batched processing model that allows an efficient, asynchronous/batched exchange of files/chunks between the main workload process and the hosted process, in a way that allows repeated cross-process transitions for every file or chunk. Moreover, the batches may be processed by different machines in parallel, thus providing scalability.

After the chunking has been performed, the pipeline runtime 102 decides whether these chunks already exist in the chunk store. To this end, the runtime calculates a digest hash (calculated for the chunk) to invoke a lookup operation the hash index service 242, and takes action based upon the results as described above.

If the chunk is marked for "add to the chunk store," the pipeline may attempt to perform compression, which may include executing the compression algorithm selector 230 (FIGS. 2 and 3) as generally described above. As also described above, a new chunk is added to the chunk store in two phases, namely first, the new chunks (or references to existing chunks) are added in a batch to the chunk store, and second, after the file chunks have been processed, the list of chunks is "committed" to the chunk store. In one implementation, the list of chunk locators is serialized into a "stream map" byte array, which is used to create a chunk stream; the locator of this new chunk stream is stored in the reparse point. During the commit operation, the pipeline runtime will also transactionally replace the file with a reparse point containing the ID and locator of the chunk stream ID as described above.

Note that the pipeline works the same way in the case of re-deduplication, which refers to again deduplicating files that were subject to writes (and thus no longer deduplicated) after the initial deduplication. In that case, chunking may be done only for the dirty ranges in the file (e.g., the ranges corresponding to data that was changed since the last optimization), as described in copending U.S. patent application entitled "Partial Recall Of Deduplicated Files" Ser. No. 12/970,848, filed concurrently herewith and hereby incorporated by reference.

As described above, the hosting infrastructure ensures secure data access from the hosted modules for the file content, so the hosted modules have controlled read-only access only to the relevant files. To this end, data streaming support (block 354) provides a class performing file handle initialization in the main (pipeline hosting) process, as generally represented in FIG. 5. This utility class implements a method (e.g., GetFileHandle([in] filePath, [in] targetProcessID, [out] duplicatedHandle) that obtains a specialized file handle that is accessible only by the target process.

Also provided is a class exposing the file handle as an IStream 550 in the hosted process, in one example implementation. This implements an in-memory IStream wrapper around the read-only file handle passed in the file-specific DDP_BATCH_ITEM by the module host interface. The internal members of this class include the read-only file handle, file metadata and the current read offset.

Figure 6:
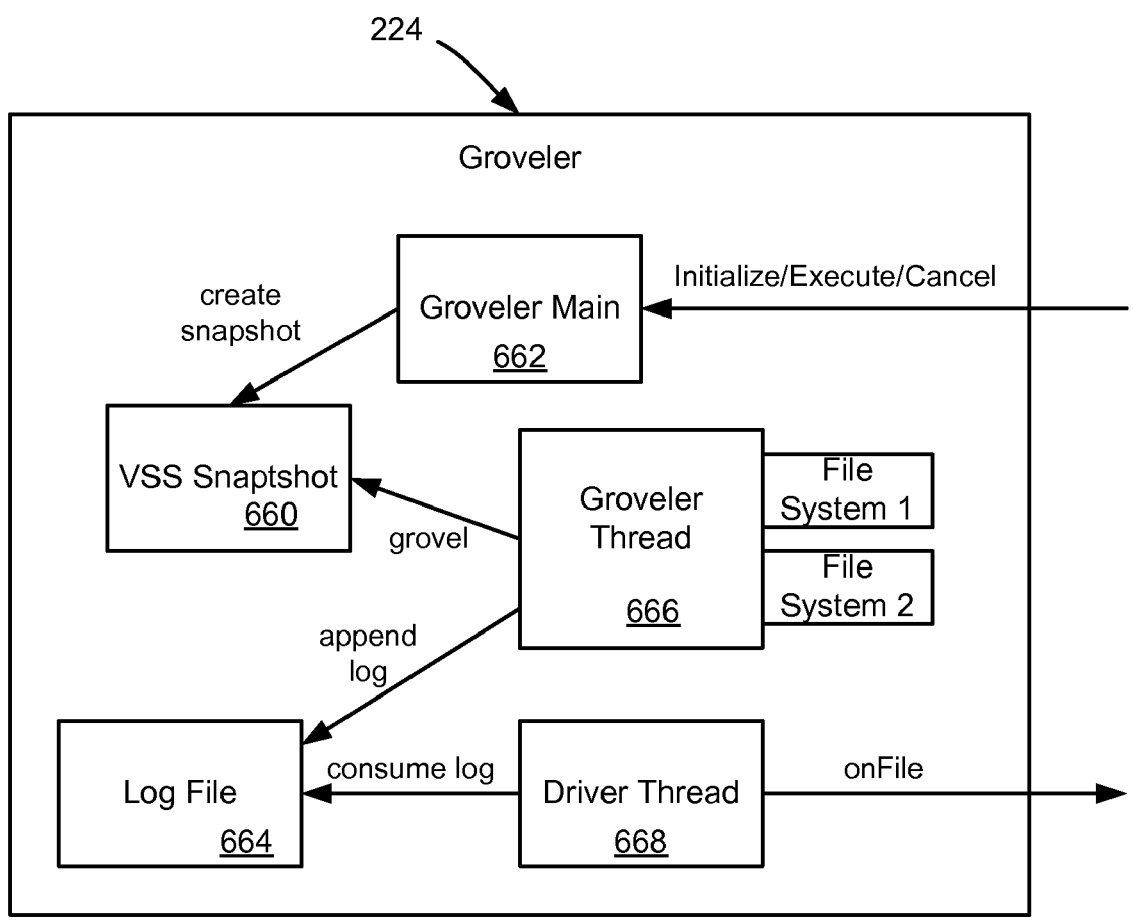
FIG. 6 is a block diagram representing how a groveler scans files via two-phase log-based file scanning in a data deduplication environment.

Turning to additional details about the groveler 224, in one implementation the groveler 224 operates via two-phase log-based file scanning, as generally represented in FIG. 6 which allows sorting, file-system isolation, statistics reporting and more. In general, during a deduplication session, a (VSS) snapshot 660 of the files may be taken by a main groveler component 662, logged into a persistent queue (log) 664, (and then the snapshot discarded). The log 664 allows for pausing and resuming and crash resistance, while minimizing the scan impact and providing other benefits, e.g., allowing for progress/status reporting, estimating the overall data size (useful in computing data structure such as index sizes), sorting and prioritizing files for deduplication and so forth.

At the time of each run, the groveler 224 enumerates the list of files that are not yet optimized and which satisfy the current policy-dictated criteria for optimization (e.g., files that are thirty days or older since the last modification). In a typical deployment, immediately after enabling deduplication on a certain volume, all files will not yet be deduplicated. In that case, the deduplication process will start to incrementally deduplicate these files (given a certain policy-driven order of optimization). This mode of execution is restartable, meaning that if the task is cancelled or interrupted due to machine reboot, the deduplication resumes the next time. Note that there is a possibility that the file is deleted/touched while the chunking is done. The system may compare the original file ID and change timestamp with the target file ID and timestamp before the actual change; if there is a mismatch, deduplication is aborted for that particular file.

Thus, the groveling/scanning is done by a groveler thread 666 on a snapshot in the log file 664. More particularly, the groveler main component 662 is created by the pipeline 102, and accepts control calls from the pipeline, including taking a snapshot of the volume during initialize. The groveler thread 666 appends entries to the log file 664, generally to minimize the snapshot's lifetime (as an optimization). The pipeline is serviced from this log file 664.

The groveler thread 666 comprises the mechanism that walks the snapshot file, in a manner that may depend on the underlying file system. While walking, the groveler thread 666 appends entries to the log file 664. Also shown in FIG. 6 is a pipeline feeder (driver) thread 668. This thread services the pipeline, e.g., it crawls the log file 664, builds necessary information in the file object, and calls the pipeline::on File callback.

As can be seen, using a log file 664 as an interim location for file objects being served to the pipeline is an optimization to the entire groveling process. The log file feature minimizes the lifetime of a VSS snapshot taken for a groveling session on a volume, allows for sorting on file extension or the like, (e.g. if partitioning by type is needed), and collects the number of files, and total size in a groveling session to report progress.

Via the pipeline and the supporting components described above, the deduplication process does not maintain persistent state (it is essentially stateless, except for possibly one exception, e.g., a "restart hint" persisted by the groveler to indicate to the next scan job where to restart the scan such that incremental scans need not start from the same location over and over on a daily basis, for example). The deduplication process may be cancelled at any time, e.g., manually or in a "back-off" operation. The deduplication sequence is crash-consistent from a transactional point of view, as any crash at any point leaves the file system in a usable state, without the need for recovery. Additionally, the deduplication sequence is stable against graceful or surprise removals of the underlying volume; similar to other services, the deduplication code needs to back-off in cases where the file/volume handle becomes invalid due to a dismount.

As also described above, the pipeline is designed to work in a high performant asynchronous/batched mode in its phases, and supports independent execution of multiple data optimization pipelines in parallel for multiple volumes. The pipeline thus provides a modular extensible design for the deduplication process and algorithm selection, while meeting CPU and memory utilization requirements, performance and throughput requirements, as well as providing security via a secure and efficient hosting of optimization modules and parallel processing. Furthermore the pipeline via a selection module provides ways to limit the optimization scope and prioritize by file filtering, ranking and grouping. Deduplication thus may be improved in essentially stages, e.g., file selection, optimization, algorithm selection, and so forth.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
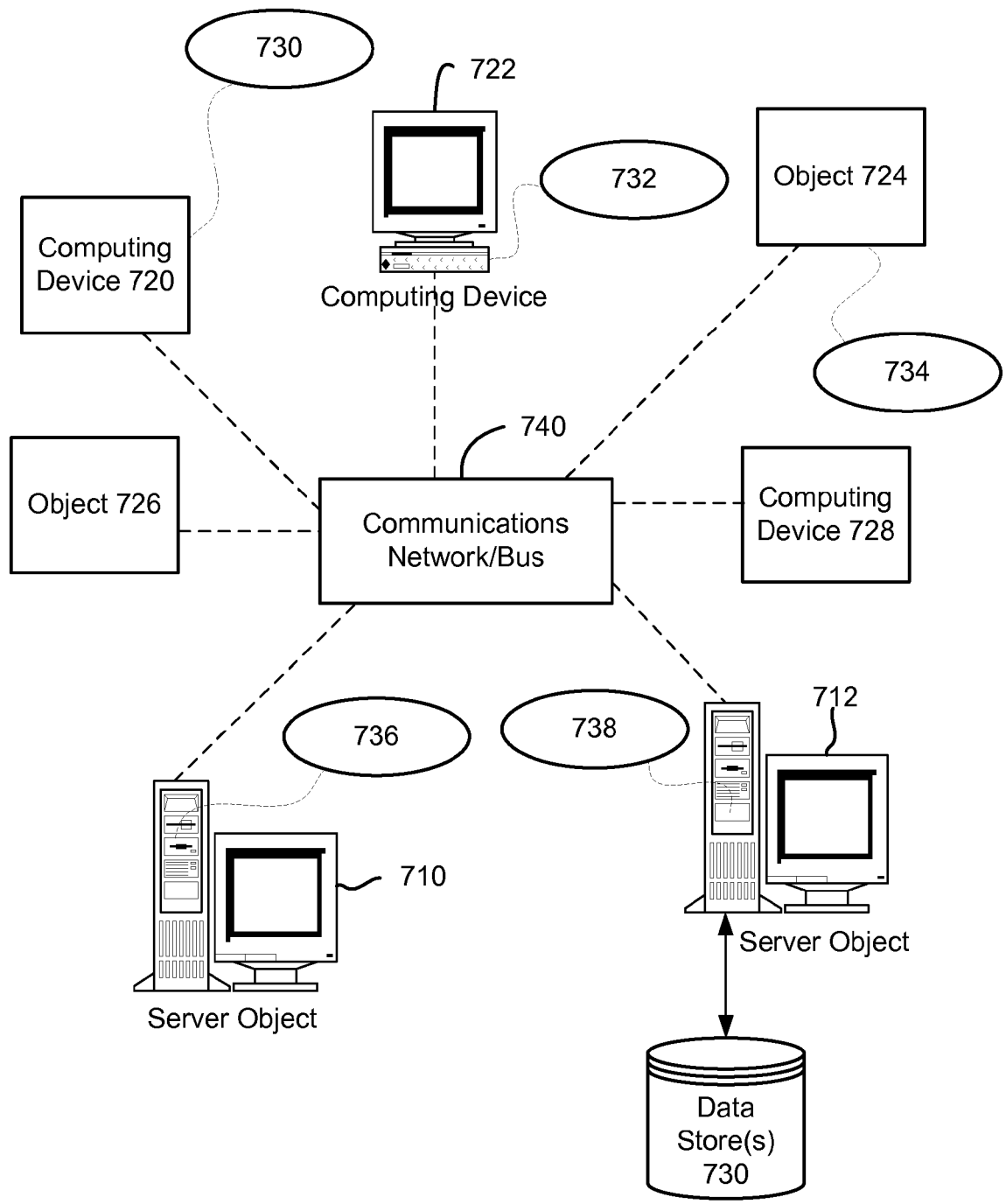
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
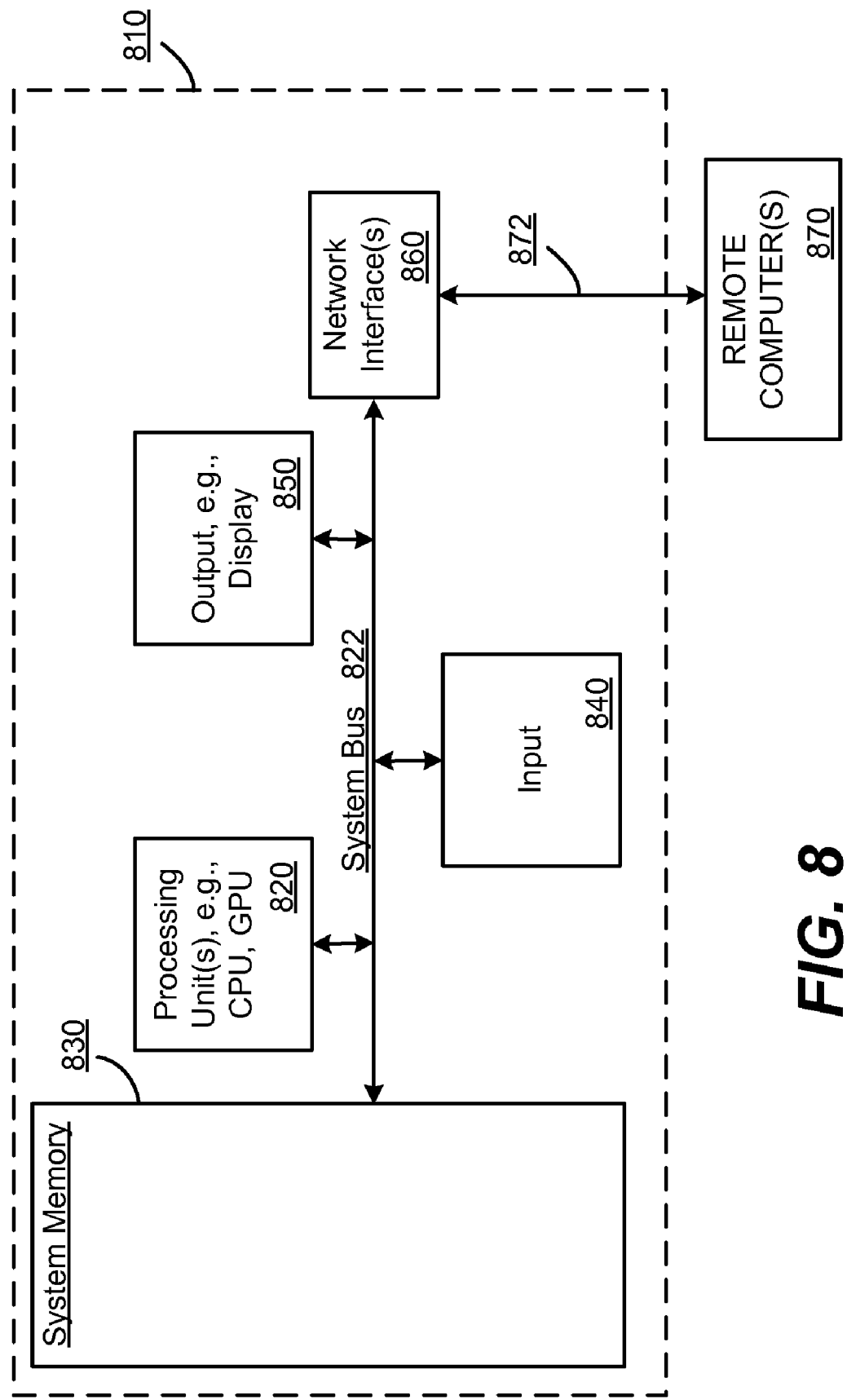
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system, comprising, a data deduplication pipeline including a chunking phase configured to split data of files into chunks, in which the chunking phase comprises one or more modules that each correspond to a chunking algorithm, a deduplication detection phase configured to determine for each chunk whether that chunk is already stored in a deduplication system, and a commit phase that commits chunks to the deduplication system that are not determined by the deduplication detection phase to be stored in the in the deduplication system, and commits reference data for chunks that are already determined to be stored in the deduplication system.

2. The system of claim 1 further comprising a chunking algorithm selector configured to select a chunking algorithm from among a plurality of available chunking algorithms of the chunking phase.

3. The system of claim 1 wherein the chunking phase comprises at least two modules that perform chunking of different subsets of the files in parallel.

4. The system of claim 1 wherein the commit phase comprises at least two modules that store chunks into one or more chunk stores of the deduplication system in parallel.

5. The system of claim 1 further comprising a compression phase including one or more modules that each correspond to a compression algorithm that compresses at least one of the chunks before committing that chunk to the deduplication system, and if the compression phase includes a plurality of available compression algorithms, the system further comprising a compression algorithm selector configured to select a compression algorithm from among the plurality of available compression algorithms.

6. The system of claim 1 further comprising a compression phase comprising at least two modules that perform compression of different subsets of the chunks in parallel, or a hashing phase comprising at least two modules that perform hashing of different subsets of the chunks in parallel, or both at least two modules that perform compression of different subsets of the chunks in parallel, and at least two modules that perform hashing of different subsets of the chunks in parallel.

7. The system of claim 1 further comprising, a scanning phase, including a groveler that selects files for deduplication via the pipeline, the groveler configured to access policy to determine which files to select for deduplication.

8. The system of claim 7 wherein the groveler operates on a snapshot of the files, and processes the snapshot to log selected files for further processing.

9. The system of claim 7 further comprising, a selection phase, the selection phase configured to receive the files identified via the scanning phase or another mechanism, or both, and to access policy to perform filtering, ranking, sorting or grouping of the files, or any combination of filtering, ranking, sorting or grouping of the files before providing the files for further processing via the pipeline.

10. The system of claim 1 wherein the pipeline is configured to perform batch processing on a plurality of files, the plurality of files batched in a file queue or other batched grouping of files.

11. The system of claim 1 wherein the pipeline is configured to perform batch processing on a plurality of chunks, the plurality of chunks batched in a chunk queue or other batched grouping of chunks.

12. The system of claim 1 wherein the pipeline is coupled to a hosting process configured to host a hosted module, the hosting process configured with a data access component that securely accesses data for processing by the hosted module.

13. The system of claim 1 wherein the pipeline is tunable based upon feedback to select at least one module, tune least one module, configure at least one module, change at least one module, or extend by adding at least one module to the pipeline, or any combination thereof, wherein the feedback comprises internal feedback based on data or file properties or both discovered by the pipeline, or external feedback based on information of previously deduplicated data of one or more other deduplication systems, or both internal feedback and external feedback.

14. In a computing environment, a method performed at least in part on at least one processor, comprising, receiving files to deduplicate via phases of a data deduplication pipeline; processing the data of the files into chunks in a modular chunking phase comprising one or more chunking algorithms; providing the chunks to an indexing phase that determines whether each of the chunks already exists in a deduplication system; committing each chunk in a chunk storing phase if that chunk was determined to not already exist in the deduplication system, and committing reference data for that chunk if that chunk was determined to exist in the deduplication system; and committing reference information to the file corresponding to the chunk or chunks extracted from that file.

15. The method of claim 14 further comprising, selecting a chunking algorithm from among a plurality of available chunking algorithms based upon the file data to be chunked.

16. The method of claim 14 further comprising, obtaining a snapshot of a set of candidate files to deduplicate, scanning the candidate files to select files to deduplicate and logging the files to deduplicate into a log, and processing the files in the log based upon properties of the files, statistical properties of the files, statistically inferred properties of a file dataset, internal feedback, or external feedback, or any combination of properties of the files, statistical properties of the files, statistically inferred properties of a file dataset, internal feedback, or external feedback, to perform filtering, ranking, sorting or grouping of the files, or any combination of filtering, ranking, sorting or grouping of the files, and outputting the files to be received for further deduplication processing.

17. The method of claim 14 further comprising, compressing at least one chunk, including selecting a compression algorithm from among a plurality of available compression algorithms based upon the chunk's data, chunk metadata, file data or file metadata, or any combination of the chunk's data, chunk metadata, file data or file metadata.

18. The method of claim 14 wherein processing the data of the files into chunks comprises accessing the data via a secure process that contains at least one of the one or more chunking algorithms, including obtaining a duplicate file handle at the secure process, and using the duplicate file handle to access the data.

19. One or more computer-readable media having computer-executable instructions, which when executed perform steps, comprising: selecting files for data deduplication; queuing the files for batch processing; processing the files into chunks in a secure modular chunking phase comprising one or more chunking algorithms; queuing the chunks for batch processing; processing the chunks to determine whether each chunk already exists in a deduplication system, and if not, storing each chunk that does not already exist to the deduplication system, and if so, storing reference data for each chunk that already exists; committing the chunk or chunks, or chunk reference data for a session, or the chunk or chunks and chunk reference data for a session, to the deduplication system, in conjunction with updating an index to each chunk that did not already exist in the deduplication system; and updating file metadata to associate the file with references to the chunk or chunks.

20. the one or more computer-readable of claim 19 wherein processing the files into chunks comprises executing a plurality of chunk algorithms in parallel to process different subset of the files into chunks in parallel operations.

* * * * *